United States Patent Office 3,836,500
Patented Sept. 17, 1974

3,836,500
SOLUTIONS OF POLYBENZIMIDAZOLES YIELDING SHAPED POLYBENZIMIDAZOLE ARTICLES HAVING IMPROVED COLOR STABILITY
Gordon W. Calundann, North Plainfield, and George R. Ferment, Dover, N.J., assignors to Celanese Corporation, New York, N.Y.
No Drawing. Filed Jan. 26, 1973, Ser. No. 327,050
Int. Cl. C08f 45/44
U.S. Cl. 260—32.6 N        8 Claims

ABSTRACT OF THE DISCLOSURE

Polybenzimidazole shaped articles such as yarns, fibers, films or the like have a tendency to darken by an unknown mechanism which may include polymer photodegradability by exposure to sunlight or reaction with amine end groups on the polymer. The color stability of polybenzimidazole articles can be improved by incorporating into the solutions utilized to form the articles an amount effective to stabilize the color of the resulting polybenzimidazole articles of an amine blocking, color stabilizing reagent (such as carboxylic acid anhydrides and carboxylic acid halides) without determentally affecting the solubility of the polybenzimidazole in the solvent. Acetic anhydride is the preferred amine blocking, color stabilizing reagent.

BACKGROUND OF THE INVENTION

Polybenzimidazoles, and particularly aromatic polybenzimidazoles, are characterized by a high degree of thermal stability. They may be shaped to form fibers, films and other articles of wide utility which show great resistance to degradation by heat, hydrolytic and oxidizing media.

It has been found, however, that such shaped polybenzimidazole articles darken rapidly, for example, in a few hours, from a relatively light gold color to a dark, coffee or chocolate brown. Although it is not understood, it is believed that the darkening is due to some type of photodegradability of the polymer in which the free amine end groups present in the polymer are affected. For example, it has been postulated that hydrogen peroxide may be formed from the polybenzimidazole polymer under certain conditions, including the presence of air, which would tend to break the polymer chain. In addition, it has been suggested that the repeating units of the polymer backbone may be oxidized to a colored quinoid structure.

Regardless, however, the problem is known. A number of solutions have been attempted to impart color stability to the polybenzimidazole materials without success. For example, commercial antioxidants and ultraviolet light absorbers have been added to polybenzimidazole films and other articles. In addition, a number of treatments to polybenzimidazole yarn, films and other shaped articles such as scouring with nitrous acid and other oxidizing or reducing materials, has been attempted. In addition, a chrome treatment of the material has been attempted before dyeing. While some of these treatments have been found to lighten the ground color of the polybenzimidazole material, the material still fades upon exposure to light.

OBJECTS AND SUMMARY OF THE INVENTION

It is an object of this invention to provide a solution which may be used to produce polybenzimidazole shaped articles having improved color stability.

It is an object of this invention to provide a process suitable for the formation of polybenzimidazole materials having color stability, i.e., the ability to remain at approximately the same color level for more than a few hours. It is further an object of this invention to provide polybenzimidazole materials having improved color stability.

These and other objects of the invention are achieved in the formation of a solution suitable for the formation of shaped polybenzimidazole articles by spinning or casting in which a polybenzimidazole is dissolved in a solvent, the improvement which comprises adding thereto a minor amount of a color stabilizing reagent to react with amine end groups on the polybenzimidazole and thereby stabilize the color of the resulting shaped polybenzimidazole article without detrimentally affecting the solubility of the polymer in the said solvent. Suitable color stabilizing reagents include carboxylic acid anhydrides and carboxylic acid halides.

In other aspects, these and other objects of the present invention are achieved by a process for forming shaped articles of polybenzimidazoles which comprises removing the solvent from the above-identified solution to form a resulting shaped article of polybenzimidazole and the resulting polybenzimidazole shaped material having improved color stability.

Unless otherwise indicated, all percentages, parts and proportions as used herein in the specification and claims are by weight.

DETAILED DESCRIPTION OF THE INVENTION

Polybenzimidazoles are a known class of heterocyclic polymers which consist essentially of recurring units of the following formulas I and II. Formula I is:

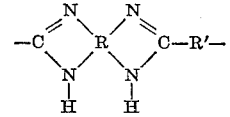

wherein R is a tetravalent aromatic nucleus, with the nitrogen atoms forming the benzimidazole rings being paired upon adjacent carbon atoms, i.e., ortho carbon atoms, of the aromatic nucleus, and R' is a member of the class consisting of an aliphatic (alkylene) group, preferably having 4 to 8 carbon atoms, a cycloaliphatic ring, an aromatic ring and a heterocyclic ring such as pyridine, pyrazine, furan, quinoline, thiophene, and pyran. Formula II is:

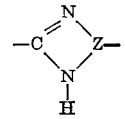

wherein Z is an aromatic nucleus having the nitrogen atoms forming the benzimidazole ring paired upon adjacent carbon atoms of the aromatic nucleus.

Preferably, the continuous filamentary materials are prepared from aromatic polybenzimidazoles, that is, from polymers consisting essentially of the recurring units of Formula II and of Formula I wherein R' is an aromatic ring or a heterocyclic ring.

As set forth in the U.S. Pat. 3,174,947 and Reissue Pat. 26,065, which are incorporated herein by reference, the aromatic polybenzimidazoles having the recurring units of Formula II may be prepared by self-condensing a trifunctional aromatic compound containing only a single set of ortho-disposed diamino substituents and an aromatic, preferably phenyl, carboxylate ester substituent. Exemplary of polymers of this type is poly-2,5(6)-benzimidazole prepared by the auto-condensation of phenyl-3,4-diaminobenzoate.

As also set forth in the above-mentioned patents, the aromatic polybenzimidazoles having the recurring units of Formula I may be prepared by condensing an aromatic tetraamine compound containing a pair of ortho-diamino substituents on the aromatic nucleus with a dicarboxyl compound selected from the class consisting of (a) the diphenyl ester of an aromatic dicarboxylic acid, (b) the diphenyl ester of a heterocyclic dicarboxylic acid wherein the carboxyl groups are substituents upon carbon in a ring compound selected from the class consisting of pyridine, pyrazine, furan, quinoline, thiophene and pyran and (c) an anhydride of an aromatic dicarboxylic acid.

Examples of aromatic polybenzimidazoles which have the recurring structure of Formula I and and which may be formed into fibers or yarns include:

poly-2,2'(m-phenylene)-5,5'-bibenzimidazole;
poly-2,2'(pyridylene-3",5")-5,5'-bibenzimidazole;
poly-2,2'-(furylene-2",5")-5,5'-bibenzimidazole;
poly-2,2'-(naphthalene-1",6")-5,5'-bibenzimidazole;
poly-2,2'-(biphenylene 4",4''')-5,5'-bibenzimidazole;
poly-2,6-(m-phenylene)-dimidazobenzene;
poly-2,2'cyclohexenyl-5,5'-bibenzimidazole;
poly-2,2'-(m-phenylene)-5,5'-di(benzimidazole) ether;
poly-2,2'-(m-phenylene)-5,5'-di(benzimidazole) sulfide;
poly-2,2'-(m-phenylene-5,5'-di(benzimidazole) sulfone;
poly-2,2'-(m-phenylene)-5,5'-di(benzimidazole) methane;
poly-2',2''-(m-phenylene)-5',5''-di(benzimidazole) propane-2,2; and
poly-2',2''-(m-phenylene)-5,5''-di(benzimidazole) ethylene-1,2 where the double bonds of the ethylene groups are intact in the final polymer.

The preferred aromatic polybenzimidazole fiber or yarn is one prepared from poly-2,2'-(m-phenylene)-5,5'-bibenzimidazole, the recurring unit of which is:

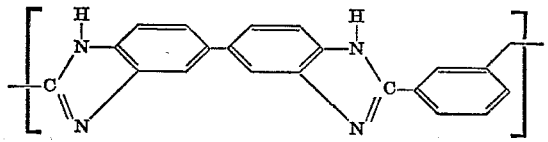

Any polymerization process known to those skilled in the art may be employed to prepare the polybenzimidazole which may then be formed into a continuous filamentary material. Preferred techniques used to prepare the polybenzimidazole are disclosed in U.S. Pats. 3,509,108 and 3,551,389, both assigned to the assignee of the present invention and both herein incorporated by reference.

With respect to aromatic polybenzimidazoles, preferably equimolar quantities of the monomeric tetraamine and dicarboxyl compound are introduced into a first stage melt polymerization reaction zone and heated therein at a temperature above 200° C., preferably at least 250° C., and more preferably from about 270 to 300° C. The reaction is conducted in a substantially oxygen-free atmosphere, i.e., below about 20 p.p.m. oxygen and preferably below about 8 p.p.m. oxygen, until a foamed prepolymer is formed having an inherent viscosity, expressed as deciliters per gram, of at least 01, and preferably from about 0.13 to 0.3, the inherent viscosity (I.V.) as used in the present specification and claims being determined from a solution of 0.4 grams of the polymer in 100 ml. of 97 percent $H_2SO_4$ at 25° C.

After the conclusion of the first stage reaction, which normally takes at least 0.5 hours and preferably 1 to 3 hours, the foamed prepolymer is cooled and then powdered or pulverized in any convenient manner. The resulting prepolymer powder is then introduced into a second stage polymerization reaction zone wherein it is heated under substantially oxygen-free conditions, as described above, to yield a polybenzimidazole polymer product, desirably having an I.V., as measured above, of at least 0.6, e.g., 0.80 to 1.1 or more.

The temperature employed in the second stage is at least 250° C., preferably at least 325° C., and more preferably from about 350 to 425° C. The second stage reaction generally takes at least 0.5 hours, and preferably from about 1 to 4 hours or more.

A preferred method of preparing the polybenzimidazole is disclosed in the aforesaid U.S. Pat. 3,509,108. As disclosed therein, aromatic polybenzimidazoles may be prepared by initially reacting the monomer in a melt phase polymerization at a temperature above 200° C. and a pressure above 50 p.s.i. (i.e., 300 to 600 p.s.i.) and then heating the resulting reaction product in a solid state polymerization at a temperature above about 300° C. (e.g., 350 to 500° C.) to yield the final product.

The foregoing polybenzimidazoles are generally formed into filaments and films by dry or wet extruding of a solution of the polymer in an appropriate solvent such as N,N-dimethylacetamide, N,N-dimethylformamide, dimethylsulfoxide, N-methyl-2-pyrrolidone or sulfuric acid (the latter being used only in wet spinning) through an opening of predetermined shape into an evaporation atmosphere for the solvent, in which most of it is evaporated, or into a coagulation bath, resulting in the polymer article having the desired shape. In the case of filaments, this is called "dry spinning" or "wet spinning" respectively. Films may also be formed by casting.

The forming solution (or "dope") often contains about 10 to about 30, preferably from about 15 to about 25, percent of the polymer based on the total weight of the solution and from about 60 to about 90, preferably from about 65 to about 85, percent solvent based on the total weight of the solution. As understood by those skilled in the art, solutions used to prepare films may contain the polymer in lower amounts than solutions used to prepare fibers. The forming solution may also contain a minor amount of, for example, 0.5 to 10, preferably 1.5 to 5, percent based on the weight of solution of additive in solvent (before the addition of polymer) of an additive such as lithium chloride, zinc chloride, N-methylmorpholine, triethylamine or triethanolamine to stabilize the solution.

As known to those skilled in the art, the viscosity of the forming solution may vary depending upon the particular article to be formed (e.g., film, yarn or the like). Generally, solution viscosity will be in the range of from about 300 to about 3,000 poise, preferably in the range of from about 400 to about 2,000 poise, at 30° C.

The polymer may be dissolved in the solvent by mixing the materials at a temperature above the normal boiling point of the solvent, for example, from about 25 to about 120° C. above said boiling point, and at a pressure of 2 to 15 atmospheres for a period of from 1 to 5 hours.

The forming solution of the present invention further contains an amount effective to stabilize the color of the resulting polybenzimidazole formed material of a color stabilizing reagent. Generally, the solution will contain from about 0.15 to about 10 or more, preferably from about 0.5 to about 5, percent of the polymer of the color stabilizing reagent.

Although the mechanism of reaction is not known and we do not wish to be bound by theoretical consideration, the color stabilizing reagent apparently reacts or otherwise ties up with the amine end groups present in the polybenzimidazole material to form amide groups, thus preventing the formation of hydrogen peroxide, and/or oxidation of the amine group or other possible mechanism of degradation.

Suitable color stabilizing reagents include carboxylic acid anhydrides and carboxylic acid halides. The preferred carboxylic acid anhydrides are the aliphatic carboxylic acid anhydrides and their derivatives and most preferred are the lower (i.e., 1 to about 6 carbon atoms) aliphatic carboxylic acid anhydrides and their derivatives such as acetic anhydride, propionic anhydride, butyric anhydride, trifluoroacetic anhydride, trichloroacetic anhydride, and the like. Suitable carboxylic acid halides include the halides of the acids of the above-defined carboxylic acid anhydrides and thus include acetyl fluoride, acetyl chloride, acetyl bromide, butyl chloride, trichloroacetyl chloride, and the like.

Incorporation of the carboxylic acid anhydride or carboxylic acid halide into the forming solution generally liberates a small amount of the carboxylic or halide acid which can protonate the polybenzimidazole. Protonation of the polybenzimidazole may lighten the polymer ground color but does not appear to impart any significant improved color stability. Substantially protonation, such as could be imparted by substantial amounts of a strong acid, can detrimentally affect the solubility of the polybenzimidazole since strongly acidified polybenzimidazole will not dissolve in the forming solvent and strong acids will precipitate the polymer or addition to a polybenzimidazole solution.

Other suitable color stabilizing reagents which apparently stabilize the color by reacting with the amine end groups of the polybenzimidazole without (regardless of mechanism) detrimentally affecting the solubility of the polymer in the solvent may also be used. Such suitable reagents include particularly tosyl chloride and 2,4-dinitrofluorobenzene.

The resulting polybenzimidazole solution containing the color stabilizing reagent may then be filtered to remove any undissolved polymer which might otherwise clog a spinning, casting or other forming orifice and treated in conventional fashion to produce a polybenzimidazole shaped material such as fibers, films or the like. The solution may be dry spun, wet spun, or cast in accordance with known techniques to form the polybenzimidazole shaped article.

The resulting article shows a color stability, that is, it substantially resists darkening for a period of at least 12, preferably more than 24 hours.

The invention will be additionally illustrated in connection with the following examples, which are for illustrative purposes only and are not to be considered as limiting of the present invention.

EXAMPLE I

A polybenzimidazole prepared in accordance with Example I of U.S. Pat. 3,509,108 is dissolved in N,N-dimethylformamide solvent in an amount of 23.0% to form a solution. The solvent also contained 2% lithium chloride. 2.3% of the solution (10% by weight of the polymer) of acetic anhydride is added to the solution.

The resulting solution, which has a viscosity (30° C.) of 430 poise, is dry-spun into fibers which are drawn in accordance with known drawing techniques. The resulting filaments are colorstable and maintain their color without significant darkening for over 24 hours.

Filament made from similar polybenzimidazole solutions without, however, the addition of acetic anhydride, darkened very rapidly upon exposure to sunlight.

EXAMPLE II

Acetic anhydride, trifluoroacetic anhydride, tosyl chloride and 2,4-dinitrofluorobenzene are each charged to N,N-dimethylacetamide solutions of the polybenzimidazole of Example I in amount sufficient to yield 1 and 5% of the additives based on the weight of the polybenzimidazole (in each case, 20% of the solution). Tosyl chloride (p-toluenesulfonyl chloride) and 2,4-dinitrofluorobenzene are amine blocking compounds (i.e., they each react with the amine end groups of the polybenzimidazole although the latter has a distinctive orange color which may have interfered with the results obtained. A control solution (without any additive) is also prepared. Shades changes in the samples determined after 10 SFH (Standard Fading Hours) in the Carbon Arc Fade-Ometer are shown below. The results indicate that the films formed from the solutions containing the color stabilizing reagents generally maintain lighter color with better contrast than the film formed the control solution.

| Solution additive | Amount, percent | Film color[1] As cast | After 10 SFH | Contrast[2] |
|---|---|---|---|---|
| None (Control) | | 1 | 6 | P |
| Trifluoroacetic anhydride | 1 | 1 | 3-4 | F-P |
| | 5 | <1 | 2 | F |
| Acetic anhydride | 1 | <1 | 2 | F-G |
| | 5 | <1 | 2 | F-G |
| Tosyl chloride | 1 | <1 | 3 | F |
| | 5 | 1 | 3-4 | F-P |
| 2,4-dinitrofluorobenzene | 1 | 5-6 | >6 | G |
| | 5 | 5-6 | >6 | G |

[1] Color is rated by comparison to a set of polymethylmethacrylate standards number 1 to 6 containing 1.0% to 2.0% amber dye respectively, in 0.2% increments.
[2] Adjective rating (F is fair, G is good and P is poor) as described in Federal Test Method Standard No. 191, Method 5660.0, Section 5.7.2.

COMPARATIVE EXAMPLE

Various known antioxidants, ultra-violet absorbers and mixtures are added in various amount (by weight of the polymer) to a 15% solution of the polybenzimidazole of Example I in N,N-dimethylacetamide. Films are cast and Film Color is determined before and after 10 SFH in the Carbon Arc Fade-Ometer in the same manner as Example II. The additives, amounts and results are shown below.

| Additive (amount) | Film color As cast | After 10SFH |
|---|---|---|
| None (Control) | 1 | >6 |
| Santowhite[1] (5.0%) | 2 | 4 |
| Cyasorb UV1988[2] (5.0%) | 1 | 4 |
| Santowhite (0.4%) plus Cyasorb UV1988 (0.6%) | 1 | 3 |
| Santowhite (2.0%) plus Cyasorb UV1988 (3.0%) | 1 | 6 |
| Irganox 1076[3] (5.0%) | 4 | 3 |
| Irganox 1076 (0.4%) plus Cyasorb UV1988 (0.6%) | 1 | 3 |
| Irganox 1076 (2.0%) plus Cyasorb UV1988 (3.0%) | 4 | 5 |
| Irganox 1010[4] (5.0%) | 1 | 4 |
| Cyasorb UV207[5] (5.0%) | 2 | 4 |
| Irganox 1010 (0.3%) plus Cyasorb UV207 (0.6%) | 1 | 3 |
| Irganox 1010 (2.0%) plus Cyasorb UV207 (3.0%) | 3 | 5 |

[1] Santowhite is an alkylidene bisphenol antioxidant available from the Monsanto Company.
[2] Cyasorb UV1988 is a benzylidene malonic ester ultra-violet absorber available from the American Cyanamid Company.
[3] Irganox 1076 is an alkyl phenol antioxidant available from the Geigy-Ciba Chemical Company.
[4] Irganox 1010 is an alkylidene bisphenol antioxidant available from the Geigy-Ciba Chemical Company.
[5] Cyasorb UV207 is a hydroxybenzophenone ultra-violet absorber available from the American Cyanamid Company.

Other additives including other commercially available antioxidants and ultra-violet absorbers as well as lithium iodide/cupric acetate, phenylphosphinic acid and sodium hypophosphate (and others) incorporated in the range of 0.5 to 3.0% (by weight of the polymer) show no better results.

Although the invention has been described with preferred embodiments, it is understood that variations and modifications may be resorted to as will be apparent to those skilled in the art. Such variations and modifications are to be considered within the purview and scope of the claims appended hereto.

What is claimed is:
1. An improved solution suitable for the formation of shaped polybenzimidazole articles which comprises
  (i) a solvent, capable of dissolving a polybenzimidazole, which is selected from the group consisting of N,N - dimethylacetamide, N,N - dimethylformamide, dimethylsulfoxide, N-methyl-2-pyrrolidone, and sulfuric acid;
  (ii) a polybenzimidazole consisting essentially of recurring units selected from the group consisting of
    (I) a unit of the formula

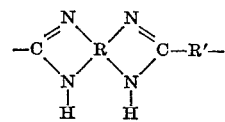

wherein R is a tetravalent aromatic nucleus, with the nitrogen atoms forming the benzimidazole rings being paired upon adjacent carbon atoms of said aromatic nucleus, and R' is selected from the group consisting of (1) an aromatic ring, (2) an aliphatic group (3) a cycloaliphatic ring, and (4) a heterocyclic ring selected from the group consisting of (a) pyridine, (b) pyrazine, (c) furan, (d) quinoline, (e) thiophene, and (f) pyran; and
(II) a unit of the formula

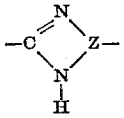

wherein Z is an aromatic ring having the nitrogen atoms forming the benzimidazole ring paired upon adjacent carbon atoms of the aromatic ring; and
(iii) an amount, effective to stabilize the color of the resulting shaped polybenzimidazole article, of a color stabilizing reagent selected from the group consisting of (1) aliphatic carboxylic acid anhydrides having 1 to about 6 carbon atoms, (2) aliphatic carboxylic acid halides having 1 to about 6 carbon atoms, (3) tosyl chloride, and (4) 2,4-dinitrofluorobenzene.

2. The solution of claim 1 wherein the color stabilizing reagent is present in the solution in an amount of from about 0.15 to about 10 percent by weight, based on the weight of the polybenzimidazole present therein.

3. The solution of claim 2 wherein the polybenzimidazole is an aromatic polybenzimidazole.

4. The solution of claim 3 wherein the color stabilizing reagent is selected from the group consisting of aliphatic carboxylic acid anhydrides having 1 to about 6 carbon atoms and aliphatic carboxylic acid halides having 1 to about 6 carbon atoms.

5. The solution of claim 3 wherein the solvent is N,N-dimethylacetamide and the color stabilizing reagent is acetic anhydride.

6. The solution of claim 3 wherein the solvent is N,N-dimethylformamide and the color stabilizing reagent is acetic anhydride.

7. The solution of claim 5 wherein the polybenzimidazole is poly-2,2'-(m-phenylene)-5,5'-bibenzimidazole.

8. The solution of claim 5 wherein the polybenzimidazole is poly-2,2'-(m-phenylene)-5,5'-bibenzimidazole.

References Cited
UNITED STATES PATENTS

| | | | |
|---|---|---|---|
| 3,174,947 | 3/1965 | Marvel et al. | 260—78.4 |
| 3,408,336 | 10/1968 | Benson | 260—78.4 |
| 3,432,476 | 3/1969 | Kuwabara et al. | 260—45.85 |
| 3,433,772 | 3/1969 | Chenevey | 260—78.4 |
| 3,468,851 | 9/1969 | Yoda et al. | 260—45.85 |
| 3,498,948 | 3/1970 | Minami et al. | 260—78.4 |
| 3,509,108 | 4/1970 | Prince | 260—78.4 |

OTHER REFERENCES

Abstracts of Papers—150th Meeting, Atlantic City, N.J., Sept. 12 to 17, 1965, American Chemical Society; p. 17W.

V. P. HOKE, Primary Examiner

U.S. Cl. X.R.

260—30.8 R, 30.2, 30.8 DS, 78.4 D, 78.4 R, 45.8 A, 45.7 R, 45.85